Feb. 9, 1971     S. H. BASSETT     3,561,181
REPLICA WOODEN BEAMS

Filed Aug. 16, 1968     3 Sheets-Sheet 1

INVENTOR.
STEPHEN H. BASSETT
BY
Rachenbach + Siegel
ATTORNEYS

Feb. 9, 1971  S. H. BASSETT  3,561,181
REPLICA WOODEN BEAMS
Filed Aug. 16, 1968  3 Sheets-Sheet 2
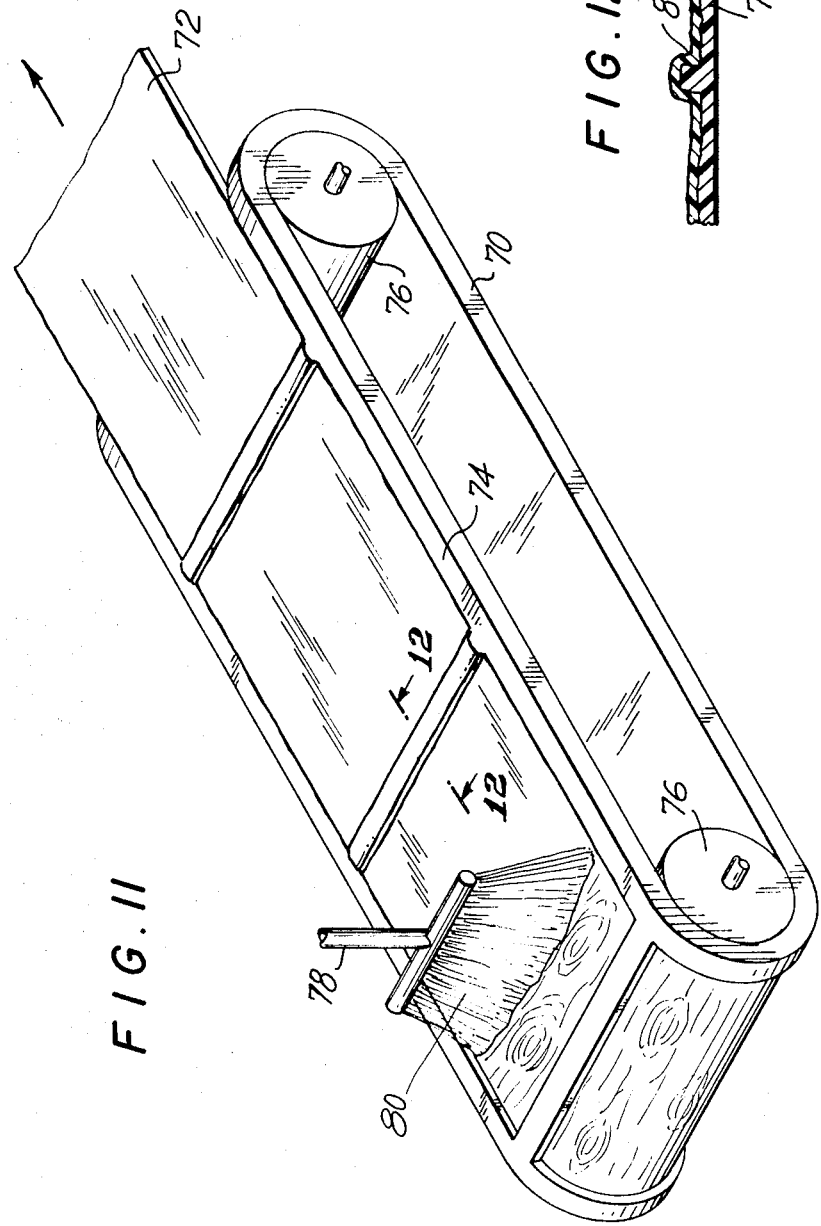
INVENTOR.
STEPHEN H. BASSETT
BY
Rachenbach & Siegel
ATTORNEYS Feb. 9, 1971  S. H. BASSETT  3,561,181
REPLICA WOODEN BEAMS
Filed Aug. 16, 1968  3 Sheets-Sheet 3
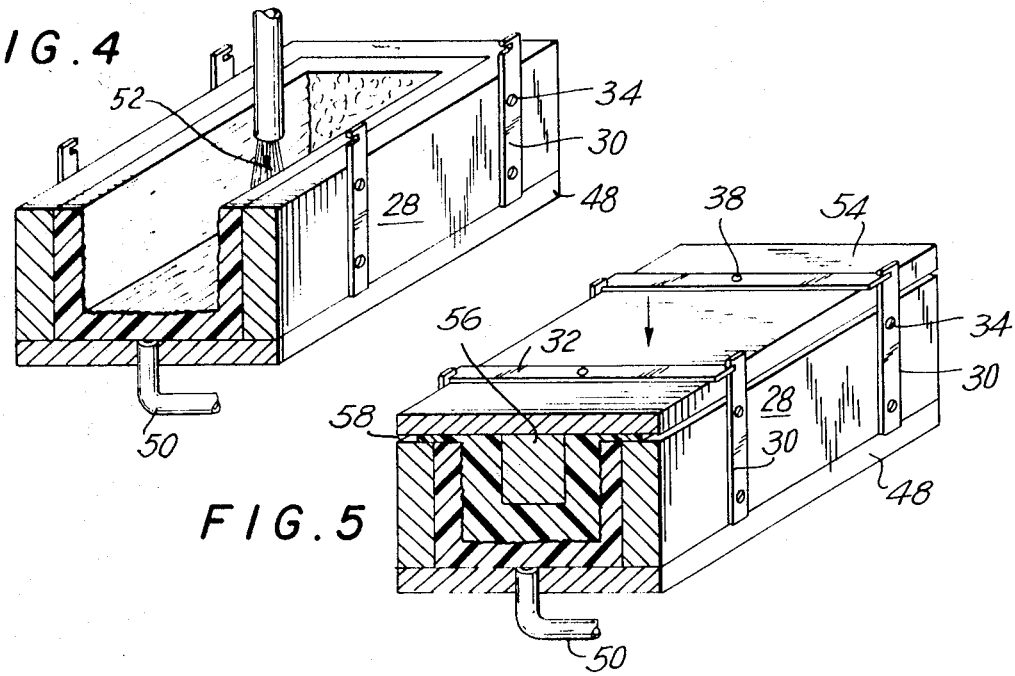
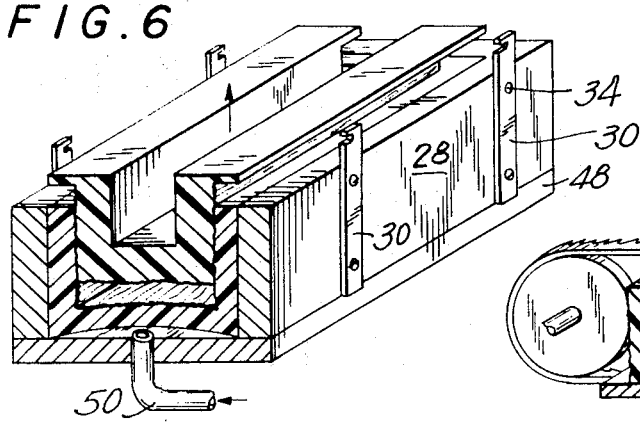
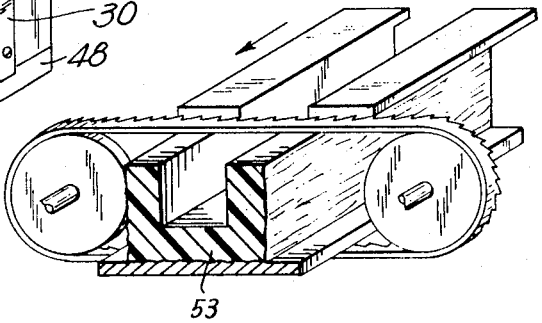
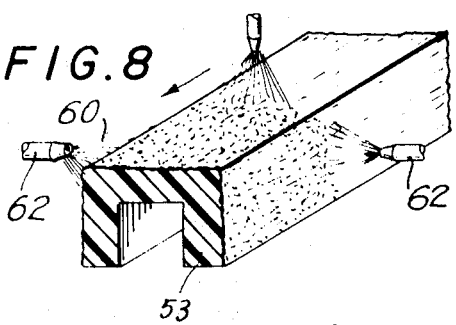
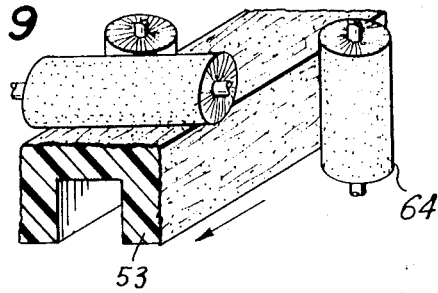
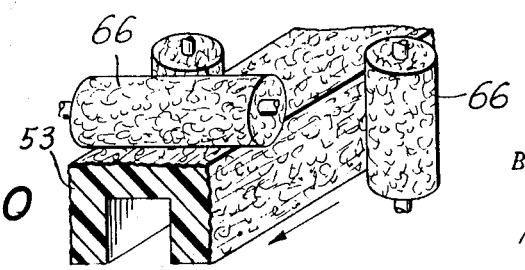
INVENTOR.
STEPHEN H. BASSETT
BY
Rachenbach & Siegel
ATTORNEYS

United States Patent Office 3,561,181
Patented Feb. 9, 1971

3,561,181
REPLICA WOODEN BEAMS
Stephen H. Bassett, New York, N.Y., assignor to Paeco, Inc., a corporation of New Jersey
Filed Aug. 16, 1968, Ser. No. 753,117
Int. Cl. E04c 2/10, 19/02
U.S. Cl. 52—309                                         5 Claims

ABSTRACT OF THE DISCLOSURE

Molded plastic articles, such as replica wooden beams and panels and methods and apparatus of manufacture thereof. The article comprises a foamed urethane stained to provide coloration corresponding to a wooden element.

This invention relates generally to molding and, more particularly, to molded plastic articles such as replica wooden beams and panels, and to methods and apparatus for the manufacture thereof.

Wood, and particularly properly finished hardwood, has long been considered to be an exceedingly attractive and luxurious material for home and commercial furnishing and decorating. Yet further, and with recent increases in the cost of and decreases in the availability of skilled craftsmanship, and recent revival of colonial architectural styles have created a need for the development of replica handhewn and handcarved wooden articles which embody the appearance of the original article and which are yet capable of mass production, utilizing relatively unskilled or semiskilled labor, at more reasonable costs; and which may be readily and easily utilized as decorative materials.

Various plastic and other materials have been suggested as substitutes for the relatively expensive hand-carved and handhewn hardwood articles so much in current demand. However, such substitutes as have heretofore been suggested have not been entirely satisfactory, either being inferior in appearance to the original article, difficult to install, or too high a cost, too easily damaged, or too difficult to repair if damaged.

Accordingly, it is a primary object of the present invention to provide replica wooden articles, and particularly of handcarved or handhewn wooden articles, which accurately reproduce the optical, tactile and acoustic characteristics of the genuine article and methods and apparatus for manufacture thereof.

Another primary object of the present invention, in addition to the foregoing object, is the provision of such replica articles which may be readily and easily handled, utilized and installed, which are not easily damaged and which may be readily and easily repaired if damaged, and methods and apparatus for the manufacture thereof.

Yet another primary object of the present invention, in addition to each of the foregoing objects, is the provision of such replica articles which are light in weight, fire resistant, capable of being cut with ordinary woodworking tools and susceptible to being readily adhesively mounted, and methods and apparatus of manufacture thereof.

Yet still another primary object of the present invention, in addition to each of the foregoing objects, is the provision of methods and apparatus for making novel and improved molds, and molds formed thereby.

The invention resides in the combination, construction, arrangement and disposition of the various component parts and elements incorporated in improved molded articles and in the methods and apparatus for the manufacture thereof. The present invention will be better understood, and objects and important features other than those specifically enumerated above, will become apparent when consideration is given to the following details and description, which when taken in conjunction with the annexed drawing, describes, discloses, illustrates and shows certain preferred embodiments or modifications of the present invention and what is presently considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawing:

FIGS. 1–10 are each isometric, partial cross-sectional views illustrating, in sequence, steps in the practice of the present invention and apparatus thereof;

FIG. 11 is an isometric pictorial view illustrating steps and apparatus for practicing the present invention in accordance with another embodiment or modification thereof; and FIG. 12 is a cross-sectional view taken along line 12—12 of FIG. 11.

Figure 1:
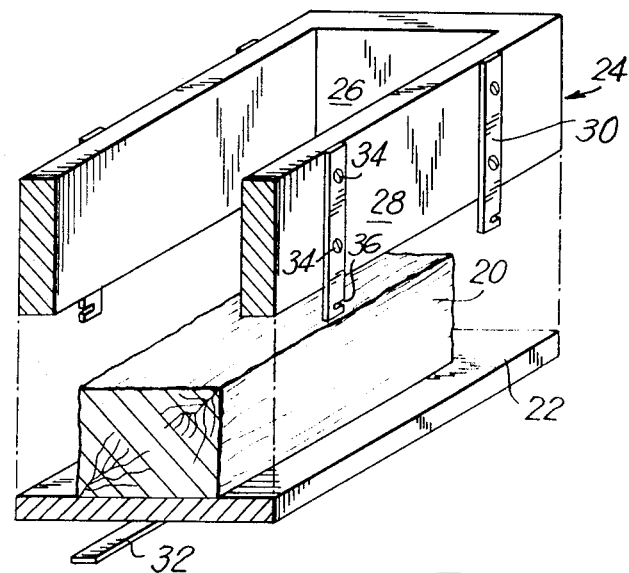

With reference now to the drawing, and particularly to FIGS. 1–10 thereof, there is shown and illustrated therein a sequence of steps and apparatus which may be utilized for the production of articles in accordance with the present invention and exemplified by the production of replica handhewn wooden beams. Generally, in accordance with the present invention, a mold is fabricated of, for example, a urethane elastomer, utilizing a handhewn wooden beam as a pattern. A foamed plastic material, such as foamed urethane, is then formed in such mold, and then stained and otherwise finished in accordance with the present invention to produce replicas of the handhewn pattern which are of exceptional realism but which may be produced at a much lower cost.

A pattern, such as a handhewn wooden beam 20 of which replicas are to be formed may, in accordance with the present invention be secured to a generally rectangular pattern board 22 in any convenient fashion, as by means of nails, screws, adhesives, or the like, generally centrally thereof so as to leave a marginal portion of the pattern board generally unobstructed. A mold box 24 comprising for example, end boards 26 and side boards 28 structurally associated with one another in generally right angle configuration may then be positioned in generally upstanding relationship to the pattern board 22 and in spaced apart relationship to the pattern 20 so as, together with the pattern board 22 to form a receptacle having a generally open and unobstructed top with the pattern 20 being disposed generally centrally within the receptacle. The mold box 24 and the pattern board 22 may be secured together, in any convenient manner. For example, the pattern board 22 and the mold box 24 may be provided with fastening means, such as hook members 30 structurally associated with the side boards 28 and latching bars 32 pivotally associated with the pattern board 22. The hook members 30 may, for example, be secured with the side boards 28, as by means of screws 34 in pairs on opposite sides of the mold box 24 and projecting outwardly thereof a distance slightly greater than the thickness of the pattern board 22 and provided with oppositely facing notches 36 adapted to be engaged by the latching bars 32 and spaced from the side boards 28 a distance substantially equal to the thickness of the pattern board 22. The latching bars 32 may be pivotally associated with the pattern board 22 in any convenient manner, as by each latching bar 32 being secured thereto by a pivot screw 38.

The mold box 24 may then be filled with an appropriate mold material. For example, a urethane casting elastomer which will cure to approximately 50–60 Shore A Durometer hardness.

Since urethane elastomers react with water to generate carbon dioxide gas, the usual procedures utilized to handle such materials require that extensive precautions be utilized to maintain the material free of contact with water or moisture if an unblemished surface is to be produced. Without such precautions, the surface will generally be, at least to some extent, pockmarked. In the present usage, it is exceedingly important that the surface of the elastomer adjacent the pattern 20 be free of any pockmarking. Additionally, accurate mold formation requires that the elastomer be in intimate contact with the pattern 20.

While it has been generally recognized that contact with moisture will produce carbon dioxide gas and the attendant bubbling, prior efforts to prevent such bubbling have been directed towards elimination of moisture to prevent the formation of carbon dioxide bubbles. However, it has not been previously recognized that it is not the presence of water that creates flaws in the cured material but, rather, the presence of the bubbles which causes the flaws. Accordingly, it is not necessary to completely eliminate moisture, provided that the usual effects of moisture presence, namely bubbling, are eliminated. Accordingly, curing the elastomer mold 40 under heat and pressure, as in a pressure vessel or autoclave 42 retains the elastomer in intimate contact with the pattern 20 and prevents the formation of carbon dioxide bubbles.

Figure 2:
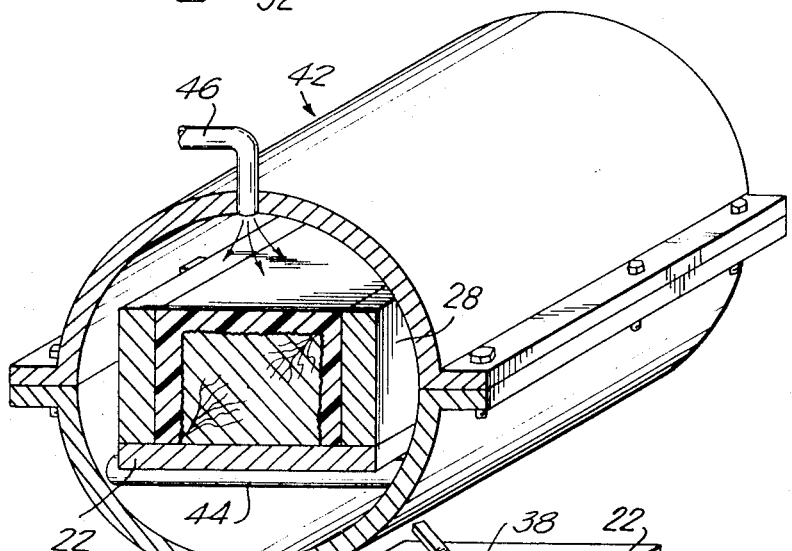
Figure 3:
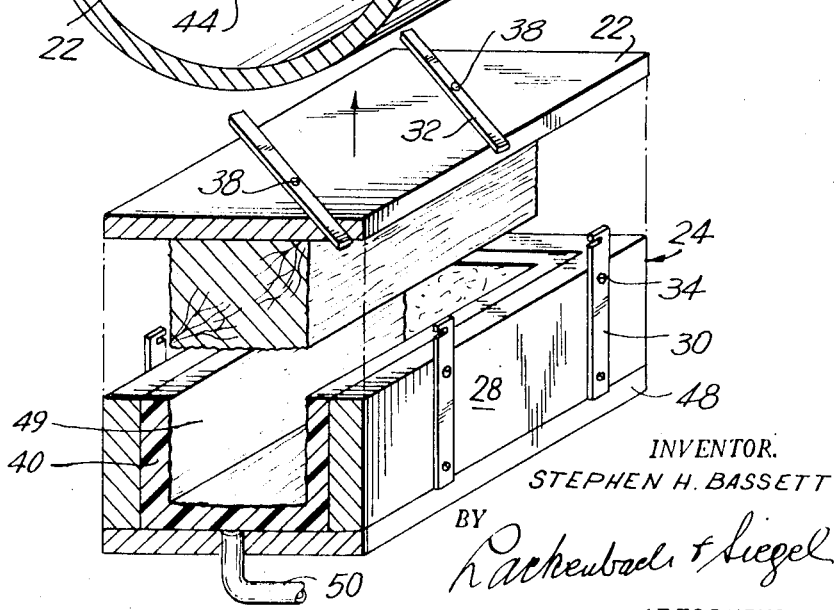

As an aid in positioning the mold box within the autoclave or pressure vessel 42, a plurality of rollers 44 may be provided therein for supporting the pattern board 22 and hot dry air, for example at approximately 250° F. and 60 lbs. per square inch pressure may be maintained within the autoclave 42, as through an air inlet 46, as illustrated diagrammatically in FIG. 2.

Following curing of the mold 40 within the autoclave 42, the pattern 20 and pattern board 22 may be removed, ot leave a mold cavity 49 in the mold 40, with the walls of the mold 40 being, for example, ⅜–½" thick. By application of a release compound to the pattern 20 and the pattern board 22, they may be readily removed from contact with the mold 40. If no release compound is utilized on the mold box 24, the mold 40 will be securely bonded thereto.

A mold board 48 may then be fitted to the mold box 24 adjacent the bottom of the mold 40 and secured with the end boards 26 and side boards 28 in any convenient manner, as by means of glue, nails, screws, and the like. The mold board 48 may be provided with one or more air fittings 50 for use in ejecting the finished articles from the mold, as will be described in more detail hereinafter.

If desired, the mold 40 may be fabricated of other materials, such as silicones and may be impregnated with materials, such as oil, as an aid in releasing finished articles from the mold.

The completed molds may then be utilized for the molding of replicas of the pattern, such as replica wooden beams from a material, such as urethane resin foam. For a number of reasons, which will become apparent hereafter, it has been found preferable to utilize a resin system having a relatively high viscosity, short rise time, short cream time, and rapid gelation time. For example, General Latex foam system No. RUR 141–30, which has a free density of approximately 4 lbs. per cubic foot; a cream time of approximately 60 seconds, a rise time of approximately 180 seconds, a viscosity approximately within the range of 1,000–2,000 centipoise; exhibits poor horizontal movement and poor flowability has been found to be particularly suited for the production of replica wooden beams in accordance with the present invention. It is to be expressly understood, however, that many other systems are suitable for use in the present invention having, for example, a free rise density of 2–6 lbs. per cubic foot.

The mold may be moved under a nozzle, as indicated by FIG. 4, and filled part-way with the urethane resin. It has been found advisable that a slightly greater quantity of resin be utilized than that necessary to fill the cavity and, for example, a quantity sufficient to result in a final density averaging approximately 8 lbs. per cubic foot has been found to work satisfactorily. The poor flowability and high viscosity aid in attaining a proper distribution of resin within the elongated cavity. After the resin 52 has been deposited in the mold cavity, a cover 54 having secured thereto a core member 56 may be affixed to the mold box 24, as illustrated in FIG. 5. The core member 56 may be structurally associated with the cover 54 in any convenient manner, as by means of adhesives, nails, screws, or the like; may be fabricated, for example, of wood; and may be of such height and thickness as to leave a space of approximately 1¼–1½" within the mold 40 for the resin 52. The interior of the cover 54 and the core member 56 may be covered or coated, for example, with a urethane elastomer to aid in release thereof from the resin 52. The cover 54 may be provided with matching bars 32 as was the pattern board 22 for cooperating with the hook members 30.

If the proper resin selection is made, as set forth hereinabove, it is not necessary for the hook members 30 and latching bars 32 to tightly or sealingly hold the cover 54 on the mold box 24. It is sufficient that the hooks 30 and the latching bars 32 provide sufficient force to resist the foam pressure of the resin. In fact, the hook members 30 and the latching bars 32 may be so constructed and arranged as to leave a slight gap 58 between the cover 54 and the end and side boards 26 and 28, enabling the cover 54 to be fitted and latched with extreme facility.

The fast gelation time of the resin 52 enables the rising resin entering into the gap 58 to gel sufficiently rapidly as to form a seal between the cover 54 and the end and side boards 26 and 28, respectively, to retain the resin 52 within the mold. The core member 56 aids in forcing the rising foam upwards and outwards to fill all the details of the mold 40.

As pointed out above, a quantity of resin is preferably utilized which is somewhat greater than that necessary to fill the cavity under free rise conditions. Hence, a positive pressure is built up by the rising resin which forms a breakdown of the cell structure at the surfaces of the resin and results in a generally nonporous skin being formed integrally with the remainder of the resin retaining its porous or cellular structure. The thickness of the skin is not large, but is approximately on the order of 1/16" and, rather than being discrete, blends inwardly into the porous center. The skin or surface portions of the resin casting or article are, accordingly, of greater density than the interiors thereof, are capable of accurately filling all details of the mold 40 and provide for substantial strength and scratch and impact resistance. In fact, the skin exhibits the feel and general optical and accoustic characteristics of wood.

The resin, accordingly, is permitted to rise within the closed mold until it attains a semirigid state, which, with the example resin is sufficiently flexible to be readily and easily removed from the mold 40. Such removal may be accomplished in many ways and may, for example, by applying high pressure air to the air inlets 50 to bulge the bottom of the mold 40 generally upwardly away from the mold board 48, as shown in FIG. 6 to thereby release the molded resin from the mold 40. The molded resin article or replica beam 53 may then be stacked and left to fully cure which, with the exemplary resin, requires twelve to twenty-four hours. It should be noted that the position in which the replica beam is held during curing is important. If the beam is not stacked in a perfectly straight condition, then the beam will harden in whatever position it is stacked. A slight deviation from absolute straightness, however, is not necessarily undesirable and may result in increased authenticity, duplicating the effect of a slightly warped wooden beam.

After the replica beam 53 has fully cured, the flash or material which flowed into the gap 58 may be removed in any convenient manner, as by means of a shaper, jointer, saw, or, as shown in FIG. 7, by means of a bandsaw. Such flash removal not only provides a flat surface to aid in securing the replica beams to a desired surface but, additionally, removes the skin from the fastening surface and enables more easy securement to a wall or sealing surface with adhesives. It is to be noted that the hollow left by the core member 56 serves several useful functions. Firstly, as pointed out above, the presence of the core member 56 aids in the molding process. Secondly, as resin materials are relatively expensive, any savings in resin material may result in substantial cost savings. Thirdly, the presence of the hollow within the replica beam enables the replica beam to be utilized to cover pipes, electric cables, and the like. Finally, the presence of the hollow enables the utilization of toggle or spring type clips to secure the replica beams to a mounting surface.

After trimming, the replica beams may be readily and easily finished to provide the proper coloration. The replica beams may be readily stained to the proper colorations by means of a conventional urethane-oil base woodstain 60 which may be applied to the replica wooden beams 53 in any convenient manner, as by passing the replica beams 53 past a plurality of spray heads 62 to spray-apply the stain 60 thereto.

After the stain 60 has been applied to the surfaces of the replica beam 53, improved coloration, including variations in color density and a burnishing of the surface to increase the color realism may be accomplished by brushing the stained surfaces while the stain is still wet. For example, and with reference now to FIG. 9, the replica beam 53 may be moved past rotating cylindrical brushes 64, having, for example, nylon bristles approximately 4" long, followed by wiping as by hand or by means of fabric or pile wiping rolls 66, as shown in FIG. 10.

With reference now to FIGS. 11 and 12, there is shown and illustrated apparatus, generally designated by the reference character 70, fabricated in accordance with the present invention for continuously producing replica wood panels 72. It is to be expressly understood that while FIGS. 1–10 relate to the production of replica wooden beams and FIGS. 11 and 12 pertain to the production of replica wood panels, wood panels may be fabricated with the apparatus and methods of FIGS. 1–10 and replica wooden beams may be fabricated with the apparatus and methods of FIGS. 11 and 12. Moreover, substantially any desired shape articles may be fabricated with the apparatus and methods herein.

A mold 74 may be fabricated in any desired manner, from, for example, a silicone or urethane elastomer, as described and disclosed above and formed into a continuous belt, revolving about pulleys 76, or the like, at least one of which may be driven, as by a conventional electric motor so as to continuously move the multiple cavity mold 74 thereabout. In passing over the pulleys 76 each of the cavities of the mold 74 may pass relative to a nozzle or spray head 78 which sprays a thin, even coating of resin thereover.

The resin, for example, may comprise a urethane foam system of relatively high density, for example, a 25 lb. per cubic foot density which has a very rapid gel time. The resin 80 may be sprayed from the spray head 78 in a thin, generally even coating over the molds 74 and the replica panels 72 may be formed either individually that is, with the resin being sprayed intermittently or continuously with the flash between adjacent panels being removed in a later step. Similarly, the spray head 78 may spray continuously the full width of the mold 74 or may be constructed and arranged for oscillating or other type movement over a pattern which will entirely fill the mold cavities.

For example, the panels 72 may be formed continuously, as indicated in FIGS. 11 and 12.

The length and speed of the conveyor molds 74 may be selected so that, with the resin selected, the resin will be cured, at least to a self-supporting condition before reaching the pulleys or rollers 76 at the end of the apparatus 70 spaced apart from the spray head 78. Accordingly, upon flexing of the mold 74 as it passes over the pulleys or rollers 76, the generally rigid replica panels 72 will continue to move in a straight line, as indicated in FIG. 11 and, accordingly, will be automatically released from the mold 74 where they may then be stacked to finish curing, trimmed, finished, or otherwise further processed.

As heretofore pointed out, replica beams and panels may be produced in accordance with this invention having substantially any desired dimension and may be readily cut or severed by conventional woodworking tools to fit where required, or may be butted together to form longer assemblies. Yet further, replica beams and panels may be fabricated to dimensions which are easily handled and adapted to be readily and easily assembled in juxtaposition to represent the appearance of a single unit or assembly of greater dimension. In accordance therewith, the replica beam or panels may be molded or fabricated to additionally represent or provide replicas of fastening means, such as bolts, pegs, dowels, or the like, particularly adjacent the edges or ends therewith, as would ordinarily be utilized to secure the wooden beams with a surface or with each other. The replica fasteners may be stained or painted to match the beams, to contrast therewith, or to represent other materials, such as iron.

While the invention has been described, disclosed, illustrated and shown in terms of certain preferred embodiments or modifications which it has assumed in practice, the scope of the invention should not be deemed to be limited by the precise embodiments or modifications herein described, disclosed, illustrated or shown.

What is claimed is:

1. Replica wooden beams fabricated entirely of molded foam plastic material having the characteristics of rigid urethane foam comprising portions thereof molded to present the appearance of fasteners utilized to secure the replica beams with a surface or with similar replica beams.

2. As an article of manufacture, replica wooden beams having the feel, appearance and stain characteristics of wood fabricated of rigid urethane foam molded to a mold having a volume less than the free rise volume of said urethane foam resin, the outer skin surface thereof being non-porous and dense, and a portion of said skin being removed to define an exposed porous surface whereby the easy mounting of said beam is facilitated, said beam stained to provide colorations corresponding to a wooden beam.

3. Article of manufacture defined in claim 2 comprising, in combination, a base portion and a pair of leg portions extending generally perpendicularly thereof to define a generally U-shaped cross section with the base and legs being adapted to be exposed and with the edge portions of the legs being adapted to be mounted adjacent a surface to provide the appearance of the replica beam supporting the surface.

4. Article of manufacture defined in claim 3 wherein at least the exposed surfaces of said base and legs comprise regions wherein the pores have collapsed to define said generally non-porous skin of greater density and hardness than the pored core to provide the tactile, optical and accoustical characteristics of wood.

5. Article of manufacture defined in claim 2 wherein said foamed urethane comprises a system having a free rise density of approximately four pounds per cubic foot which has been constrained during rise to an average density of approximately eight pounds per cubic foot.

References Cited

UNITED STATES PATENTS

| 2,855,021 | 10/1958 | Hoppe | 161—ISD. DIG |
| 3,300,940 | 1/1967 | Golasz | 52—727 |
| 3,204,377 | 9/1965 | Johnson | 52—309 |
| 3,309,827 | 3/1967 | Nicosia | 52—309 |
| 3,323,267 | 6/1967 | Fish | 52—309 |
| 3,351,507 | 11/1967 | Schafer | 161—159 |

JOHN E. MURTAGH, Primary Examiner

U.S. Cl. X.R.

52—316, 716, 720